United States Patent
Yamamoto et al.

(10) Patent No.: US 6,806,647 B2
(45) Date of Patent: Oct. 19, 2004

(54) LIGHT SOURCE DEVICE WITH DISCONTINUOUS ELECTRODE CONTACT PORTIONS AND LIQUID CRYSTAL DISPLAY

(75) Inventors: Norikazu Yamamoto, Yawata (JP); Teruaki Shigeta, Neyagawa (JP); Nobuhiro Shimizu, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 23 days.

(21) Appl. No.: 10/247,086

(22) Filed: Sep. 18, 2002

(65) Prior Publication Data

US 2003/0052611 A1 Mar. 20, 2003

(30) Foreign Application Priority Data

Sep. 19, 2001 (JP) ........................................ 2001-285415
Sep. 19, 2001 (JP) ........................................ 2001-285416

(51) Int. Cl.[7] ............................................. H01J 65/00
(52) U.S. Cl. ...................... 313/607; 313/632; 313/634; 313/234; 313/488; 313/491; 315/169.1; 315/169.3
(58) Field of Search ................................ 313/607, 632, 313/634, 488, 491, 234; 315/169.1, 169.3, 246.326

(56) References Cited

U.S. PATENT DOCUMENTS

| | | | |
|---|---|---|---|
| 3,927,342 A | 12/1975 | Bode et al. | |
| 4,013,912 A | 3/1977 | Hinson | |
| 4,038,577 A | 7/1977 | Bode et al. | |
| 4,387,322 A | 6/1983 | Nixon | |
| 4,645,979 A | 2/1987 | Chow | 315/169.1 |
| 4,899,090 A | 2/1990 | Yoshiike et al. | 315/335 |
| 5,013,959 A | 5/1991 | Kogelschatz | 313/36 |
| 5,117,160 A * | 5/1992 | Konda et al. | 315/326 |
| 5,343,114 A | 8/1994 | Beneking et al. | 313/485 |
| 5,514,934 A * | 5/1996 | Matsumoto et al. | 313/607 |
| 5,604,410 A | 2/1997 | Vollkommer et al. | 315/246 |
| 5,828,180 A | 10/1998 | Shinada et al. | |
| 6,034,476 A | 3/2000 | Tamura | 313/607 |
| 6,255,782 B1 * | 7/2001 | Kuroda et al. | 315/169.1 |
| 6,331,064 B1 * | 12/2001 | Nishiyama et al. | 362/260 |
| 6,590,319 B2 | 7/2003 | Moom | |

FOREIGN PATENT DOCUMENTS

| | | |
|---|---|---|
| EP | 1 146 544 | 10/2001 |
| EP | 1 152 454 | 11/2001 |

(List continued on next page.)

*Primary Examiner*—Ashok Patel
*Assistant Examiner*—Sikha Roy
(74) *Attorney, Agent, or Firm*—Merchant & Gould P.C.

(57) ABSTRACT

A light source device includes at least one discharge tube, a discharge medium sealed inside the discharge tube, and first and second electrodes for exciting the discharge medium. The first electrode is arranged inside or outside the discharge tube, and the second electrode has a plurality of contact portions at which the second electrode is in contact with an outer surface of the discharge tube. The contact portions are located at different distances from the first electrode and are provided discontinuously. Thus, it is possible to provide a light source device with an improved light emission efficiency, and a liquid crystal display device in which the light source device is employed.

17 Claims, 21 Drawing Sheets

FOREIGN PATENT DOCUMENTS

| | | | | |
|---|---|---|---|---|
| JP | 1-143135 | 6/1989 | | |
| JP | 4-280059 | 10/1992 | ............ | H01J/61/35 |
| JP | 5-29085 | 2/1993 | | |
| JP | 6-181050 | 6/1994 | | |
| JP | 9-161726 | 6/1997 | | |
| JP | 10-112290 | 4/1998 | | |
| JP | 10-284008 | 10/1998 | | |
| JP | 11-86797 | 3/1999 | ............ | H01J/65/00 |
| JP | 2000-259088 | 9/2000 | | |
| JP | 2000-353494 | 12/2000 | ............ | H01J/65/00 |
| JP | 2001-143662 | 5/2001 | | |
| JP | 2001-237586 | 8/2001 | | |
| JP | 2001-243921 | 9/2001 | | |
| JP | 2001-243922 | 9/2001 | | |
| JP | 2001-325919 | 11/2001 | | |
| JP | 2002-42737 | 2/2002 | | |

* cited by examiner

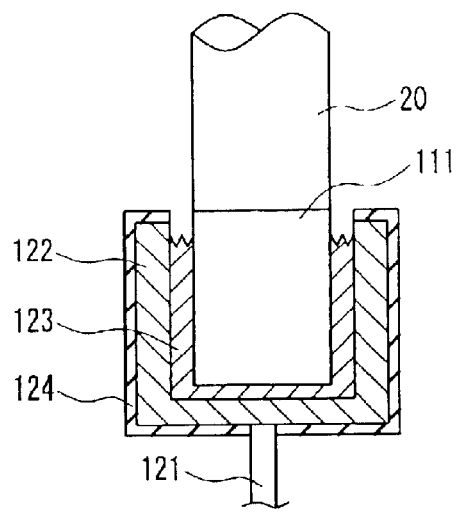 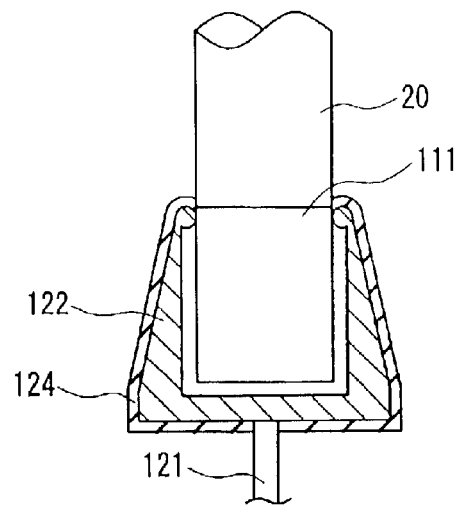
FIG. 12A    FIG. 12B
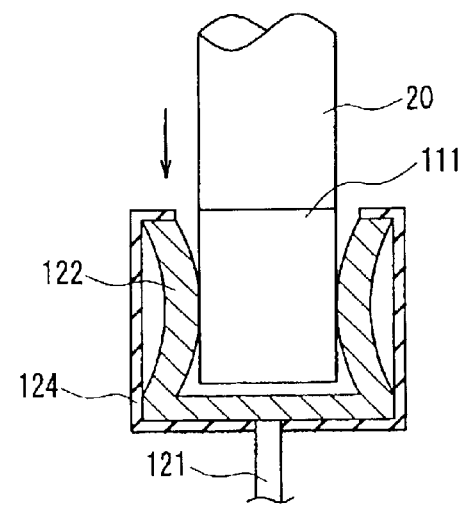 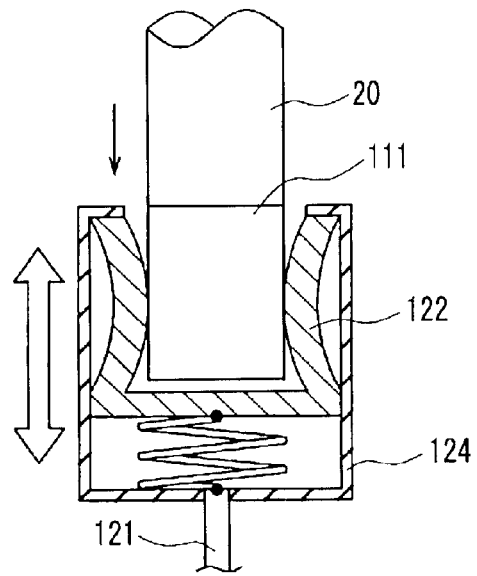
FIG. 12C    FIG. 12D

LIGHT SOURCE DEVICE WITH DISCONTINUOUS ELECTRODE CONTACT PORTIONS AND LIQUID CRYSTAL DISPLAY

BACKGROUND OF THE INVENTION

1. Field of the Invention

The present invention relates to a light source device that includes a discharge tube with a discharge medium sealed therein and electrodes for exciting the discharge medium, and relates to a liquid crystal display employing the light source device.

2. Related Background Art

Recently, regarding backlights (light source devices) for use in liquid crystal displays, etc., earnest studies have been made on backlights in which mercury is not used (a backlight of this type hereinafter sometimes is referred to as mercuryless backlight), in addition to the studies on backlights in which mercury is used. The mercuryless backlight, which does not employ mercury, does not suffer from a decrease in a light emission efficiency caused by a rise of mercury temperature, thereby having an advantage of quicker start of the emission of luminous fluxes. Further, the mercuryless backlight is environmentally preferable.

As a light source device in which mercury is not used, a discharge lamp device is disclosed that includes a bulb in which a rare gas is sealed, an inner electrode provided inside the bulb, and an outer electrode provided outside the bulb (JP 5-29085 A). The outer electrode is a linear electrode, and is formed on an outer surface of the bulb so as to be parallel with a central axis of the bulb. By applying a voltage across the inner and outer electrodes, this rare gas discharge lamp device emits light.

Further, a rare gas discharge lamp is disclosed that includes a discharge tube in which a rare gas is sealed, an inner electrode formed inside the discharge tube, and an outer electrode formed spirally on an outer surface of the discharge tube (JP 10-112290 A).

Furthermore, as a discharge lamp with a rare gas as a principal discharge medium, a discharge lamp is disclosed that includes an air-tight vessel, an inner electrode provided inside the air-tight vessel, and an outer electrode in such a form as a coil form, a mesh form, etc. (JP 2001-325919 A). This gazette discloses a method of fixing the outer electrode using a shrinkable tube.

Furthermore, a discharge lamp disclosed in U.S. Pat. No. 5,604,410 includes a discharge tube in which a rare gas is sealed, an inner electrode, and an outer electrode. The inner electrode is formed along a central axis of the discharge tube throughout a substantial entirety of the discharge tube. The outer electrode is a linear electrode, and is formed on an outer surface of the discharge tube so as to be parallel with a central axis of the discharge tube.

However, in the case where a linear outer electrode is formed throughout a substantial entirety of the discharge tube, the discharge is concentrated in the vicinity of the outer electrode, thereby becoming constricted. This sometimes makes it impossible to excite the discharge medium efficiently, sometimes resulting in a decrease in the light emission efficiency. In the case where an outer electrode in a spiral form is provided on an outer surface of a discharge tube, the discharge also tends to be constricted, since the outer electrode is brought into contact linearly with the outer surface of the discharge tube.

SUMMARY OF THE INVENTION

Therefore, with the foregoing in mind, it is an object of the present invention to provide a novel light source device, and a liquid crystal display device employing the same.

To achieve the foregoing object, a light source device of the present invention includes at least one discharge tube, a discharge medium sealed inside the discharge tube, and first and second electrodes for exciting the discharge medium. The first electrode is formed inside or outside the discharge tube, and the second electrode is in contact with an outer surface of the discharge tube at a plurality of contact portions, the contact portions being located at different distances from the first electrode and being provided discontinuously. It should be noted that cases in which the "contact of the second electrode with the outer surface of the discharge tube" is achieved include a case where the second electrode and the discharge tube are in contact with each other via a dielectric or the like. The "contact" between two members herein means that no air space is present therebetween.

In the foregoing light source device, the plurality of the contact portions may be arranged in a tube axial direction of the discharge tube.

In the foregoing light source device, the first electrode may be formed at an end of the discharge tube, and a surface density of the plurality of the contact portions may increase with decreasing proximity to the first electrode.

In the foregoing light source device, a surface of the first electrode may be covered with a dielectric.

The foregoing light source device may further include a phosphor layer formed on an inner surface of the discharge tube.

In the foregoing light source device, the discharge tube may include a glass tube, and a dielectric layer formed on an outer surface of the glass tube.

In the foregoing light source device, the second electrode may be in contact with the discharge tube via a dielectric.

In the foregoing light source device, the discharge medium may contain xenon gas, and further may contain mercury. Alternatively, in the foregoing light source device, the discharge medium containing no mercury is applicable.

The foregoing light source device further may include a supporting plate, and the discharge tube may be arranged on a side of the supporting plate.

In the foregoing light source device, the supporting plate may receive light emitted from the discharge tube and radiate the same from one principal surface of the supporting plate.

The foregoing light source device further may include a supporting plate, and may be configured so that a plurality of the discharge tubes are held on the supporting plate, the second electrode includes a plurality of linear electrodes arranged in parallel, and the discharge tubes are arranged so as to be perpendicular to the linear electrodes.

In the foregoing light source device, the discharge tubes may include a plurality of first discharge tubes, a plurality of second discharge tubes, and a plurality of third discharge tubes. The first, second, and third discharge tubes are arranged in the stated order repetitively, and the first, second, and third discharge tubes emit lights with wavelengths different from each other, respectively.

The foregoing light source device further may include a third electrode arranged on an inner surface of or around the discharge tube. The third electrode is formed in a linear form so as to be arranged in parallel with a tube axis of the discharge tube, and a potential E1 of the first electrode, a potential E2 of the second electrode, and a potential E3 of the third electrode satisfy relationships expressed as $|E2| \leq |E3| < |E1|$ and $0 \leq E1 \cdot E3$.

In the foregoing light source device, both ends of the third electrode may be connected with the second electrode at two contact portions selected from the plurality of the contact portions.

A liquid crystal display of the present invention includes the above-described light source device of the present invention, and a liquid crystal panel that transmits light emitted from the light source device. The light source device includes at least one discharge tube, a discharge medium sealed inside the discharge tube, and first and second electrodes for exciting the discharge medium. In the light source device, the first electrode is formed inside or outside the discharge tube, and the second electrode is in contact with an outer surface of the discharge tube at a plurality of contact portions, the contact portions being located at different distances from the first electrode and being provided discontinuously.

The light source device in the liquid crystal display further may include a light-guiding plate that receives light emitted from the discharge tube and allows the light to leave a principal surface thereof. The liquid crystal panel is arranged so as to face the light-guiding plate.

Furthermore, the light source device in the liquid crystal display may further include a supporting plate, and may be configured so that a plurality of the discharge tubes are held on the supporting plate, the second electrode includes a plurality of linear electrodes arranged in parallel, and the discharge tubes are arranged so as to be perpendicular to the linear electrodes.

BRIEF DESCRIPTION OF THE DRAWINGS

FIGS. 12A to 12D are views illustrating how to connect a first electrode formed outside a discharge tube with a circuit.

DETAILED DESCRIPTION OF THE INVENTION

Figure 1A:
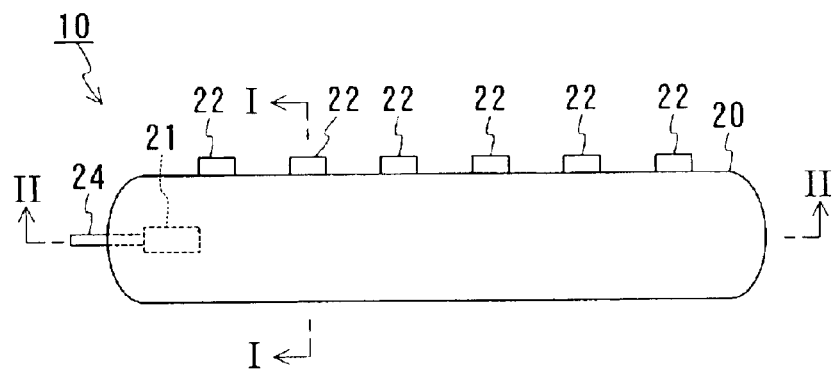
FIGS. 1A and 1B are a side view and a cross-sectional view, respectively, illustrating an example of a light source device of the present invention.

The following will describe embodiments of the present invention while referring to the drawings. It should be noted that in the following description, the same members are designated by the same reference numerals and duplicate descriptions of the same are omitted in some cases.

Embodiment 1

Figure 1B:
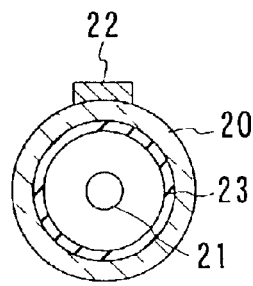

In Embodiment 1, an example of a light source device (discharge lamp device) of the present invention is described. FIG. 1A illustrates a configuration of a light source device 10 of Embodiment 1. FIG. 1B is a cross-sectional view of the light source device 10 taken along a line I—I in FIG. 1A. The light source device 10 includes a discharge tube 20, a first electrode 21 provided inside the discharge tube 20, and a second electrode 22 provided outside the discharge tube 20. The first electrode 21 is connected to a lead 24.

Figure 1C:
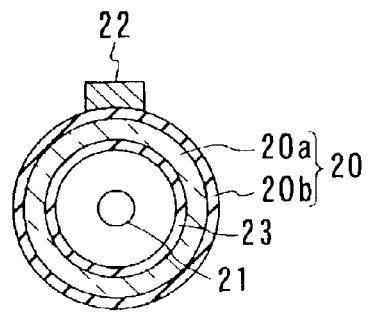
FIG. 1C is a cross-sectional view illustrating another example of a light source device.

The discharge tube 20 is made of a transparent material, for instance, borosilicate glass. Alternatively, the discharge tube 20 may be made of quartz glass, soda-lime glass, or lead glass. The discharge tube 20 may include a dielectric layer (for instance, a resin layer) arranged on an outer surface thereof An example of such a discharge tube 20 is shown in FIG. 1C. The discharge tube 20 includes a tube 20a. and a dielectric layer 20b formed on an outer surface of the tube 20a. The tube 20a is made of, for example, borosilicate glass. To form the dielectric layer 20b, it is possible to use, for instance, a multilayer film made of a polyester-based resin, or a thin film made of titanium oxide or silicon oxide. The glass tube used for forming the discharge tube 20 normally has an outside diameter of approximately 1.2 mm to 15 mm. The distance between the outer surface and an inner surface of the glass tube, that is, a thickness of the glass tube, may be approximately 0.2 mm to 1.0 mm. In the case where a dielectric layer is formed on a surface of the glass tube, the dielectric layer normally has a thickness of approximately 0.5 $\mu$m to 100 $\mu$m. It should be noted that the discharge tube 20 does not necessarily have a straight shape, but may have another shape. For instance, it may be formed in a shape of the letter L or the letter U, or in a rectangular shape.

The discharge tube 20 is sealed, and a discharge medium (not shown) is encapsulated in the discharge tube (this also applies to Embodiments described later). A rare gas can be used as the discharge medium used in the light source device 10. The rare gas used therein can be at least one selected from krypton gas, argon gas, helium gas, and xenon gas. The discharge medium may contain mercury, in addition to the rare gas. It should be noted, however, that in the case where the discharge medium does not contain mercury, it is possible to prevent the light emission efficiency from varying in response to a change in a mercury vapor pressure that is caused by a change of the ambient temperature. Besides, an ultraviolet light radiated from xenon gas has a wavelength in proximity to a wavelength of an ultraviolet light radiated from mercury. Therefore, the use of xenon gas as the rare gas has an advantage in that the same phosphor as that used in a fluorescent lamp employing mercury can be used. It should be noted that the above-described discharge media are applicable as the discharge media in Embodiments described later.

As shown in FIG. 1B, a phosphor layer 23 is formed on an inner surface of the discharge tube 20. The phosphor layer 23 is formed so as to convert a wavelength of light emitted by the discharge medium. By altering materials of the phosphor layer 23, lights with various wavelengths can be obtained. For example, white light, red, green, and blue (RGB) lights, etc. can be obtained. The phosphor layer 23 can be made of a material generally used in a discharge lamp.

Figure 1D:
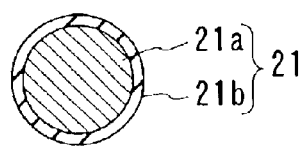
FIG. 1D is a cross-sectional view illustrating an example of a first electrode.

The first electrode 21 is formed inside an end of the discharge tube 20. The first electrode 21 can be made of a metal, for instance, tungsten or nickel. A surface of the first electrode 21 may be covered with a metal oxide layer made of, for instance, cesium oxide, magnesium oxide, barium oxide, etc. The use of such a metal oxide layer allows an illumination start voltage to decrease, thereby preventing the electrode from being degraded by ion impact. Alternatively, the surface of the first electrode 21 may be covered with a dielectric layer (for instance, a glass layer). FIG. 1D is a cross-sectional view of the first electrode 21 that includes a metal electrode 21a, and a dielectric layer 21b formed so as to cover the metal electrode 21a. The use of such a dielectric layer makes it possible to suppress current upon discharge. This suppresses the continuous flow of current upon discharge, thereby stabilizing the discharge. Furthermore, the first electrode 21 may be formed outside the discharge tube 20, as described in Embodiment 2.

The second electrode 22 is formed outside the discharge tube 20. The second electrode 22 is made of a conductive material. For instance, the second electrode 22 may be made of a metal such as copper, aluminum, phosphor bronze, etc. Alternatively, it may be made of a metal paste containing a metal powder (for example, silver powder) and a resin. Second and third electrodes described below can be made of the same materials. The second electrode 22 is in contact with an outer surface of the discharge tube 20 at a plurality of portions (contact portions) thereof that are provided discontinuously and are located at different distances from the first electrode 21.

Figure 2A:
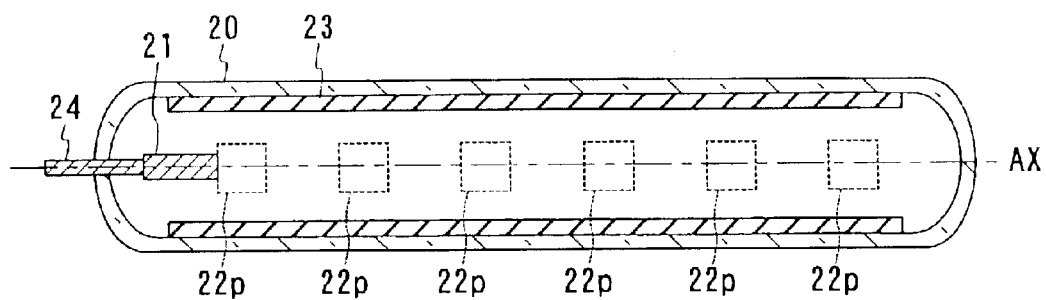
FIG. 2A is a cross-sectional view of the light source device shown in FIG. 1A.
Figure 2B:
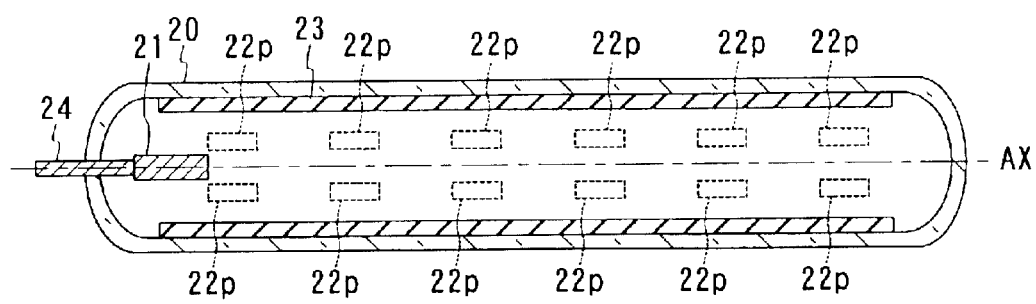
FIG. 2B is a cross-sectional view of another example.

FIG. 2A is a cross-sectional view of the light source device 10 taken along a line II—II in FIG. 1A. The second electrode 22 is in contact with the discharge tube 20 at a plurality of contact portions 22P. The plurality of contact portions 22P are located at different distances from the first electrode 21, and are separated from one another. The plurality of contact portions 22P may be arranged along a tube axial direction AX of the discharge tube 20. It should be noted that as shown in FIG. 2B, the plurality of contact portions 22P may be grouped in a plurality of groups arranged along the tube axial direction AX of the discharge tube 20. The contact portions 22P included in each group are arranged along the tube axial direction AX of the discharge tube 20. However, the arrangement of the contact portions 22P is not limited to the arrangement along the tube axial direction AX. The shape of the contact portion 22P is not limited to square. For instance, the shape of the contact portion 22P may be rectangular or linear. Furthermore, as long as some contact portions that are located at different distances from the first electrode 21 are included, contact portions located at equal distances from the first electrode 21 also may be included, as shown in FIG. 2B. A length of one contact portion 22P in the tube axial direction is in a range of, for instance, 0.1% to 5%, or for instance, 0.5% to 3%, of a length of the discharge tube 20 in the tube axial direction. A distance between two adjacent contact portions 22P in the tube axial direction preferably is greater than the thickness of the discharge tube 20, and not greater than ten times a maximum inside diameter of the discharge tube 20. By setting the foregoing distance greater than the thickness of the discharge tube 20, it is possible to prevent the discharge from being constricted linearly along the second electrode 22. Besides, by setting the foregoing distance not greater than ten times the maximum inside diameter of the discharge tube 20, it is possible to prevent the discharge from becoming non-uniform. To reduce the blockage of light by the second electrode 22, a length of the contact portion 22P in the circumferential direction of the discharge tube 20 preferably is not more than half of a circumference of the discharge tube 20.

The following will describe an example of the light source device 10. A discharge tube 20 thereof has, for instance, an outside diameter of 2.6 mm, an inside diameter of 2.0 mm, and a length of 250 mm. Rare-earth phosphors emitting light with three wavelengths that are used in general fluorescent lamps are applied on an inner surface of the discharge tube to form a phosphor layer. Contact portions 22P have a length in the tube axial direction of 3 mm each, and distances between the contact portions 22P are 1 mm each in the tube axial direction. A mixture gas of xenon gas and argon gas is sealed inside the discharge tube so that the pressure therein is approximately 21 kPa.

In the light source device 10, the application of a voltage across the first electrode 21 and the second electrode 22 causes discharge, thereby exciting the discharge medium. The discharge medium thus excited emits ultraviolet light when making a transition to a ground state. The ultraviolet light is converted into visible light by the phosphor layer 23, and the visible light is radiated from the discharge tube 20.

Figure 3A:
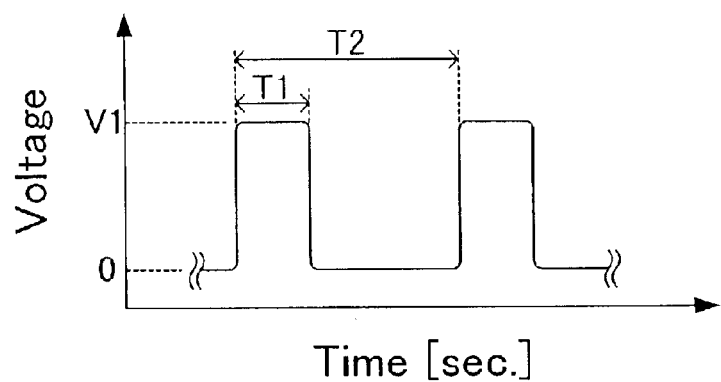
FIG. 3A is a view illustrating an example of a voltage applied to a light source device of the present invention.
Figure 3B:
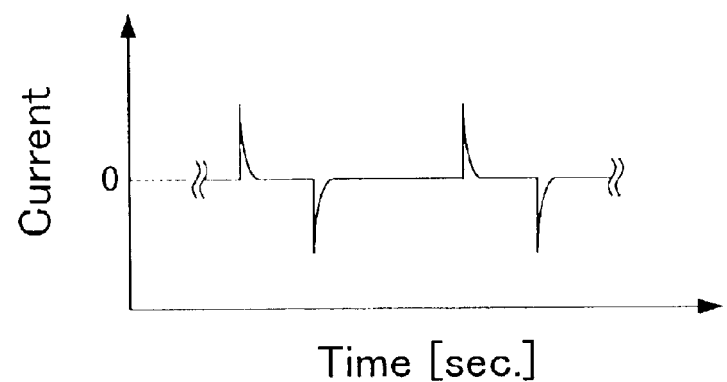
FIG. 3B is a view illustrating an example of a current flowing through electrodes.

The following will describe an example of a voltage applied across the first and second electrodes 21 and 22. The voltage applied across the first and second electrodes 21 and 22 may have a sinusoidal waveform or a rectangular waveform, and may have a polarity inversion, which however is not a requirement. In the case where mercury is not contained inside the discharge tube 20, that is, in the case where the discharge medium contains only a rare gas, it is preferable that the second electrode 22 is grounded and a rectangular-waveform voltage that has no polarity inversion is applied to the first electrode 21. An example of such an applied voltage is shown in FIG. 3A. In the example shown in FIG. 3A, the voltage applied to the first electrode 21 is modulated between 0 V and a positive voltage V1. A ratio of a time T1 for the application of the voltage V1 to a cycle T2 of the rectangular wave (T1/T2) preferably is approximately 0.15 to 0.5. The rectangular wave has a frequency in a range of, for example, 10 kHz to 60 kHz. FIG. 3B illustrates the current that flows through the foregoing two electrodes when the voltage shown in FIG. 3A is applied across the same. Current corresponding to a differentiated waveform of the applied voltage flows through the first and second electrodes 21 and 22.

Figure 4:
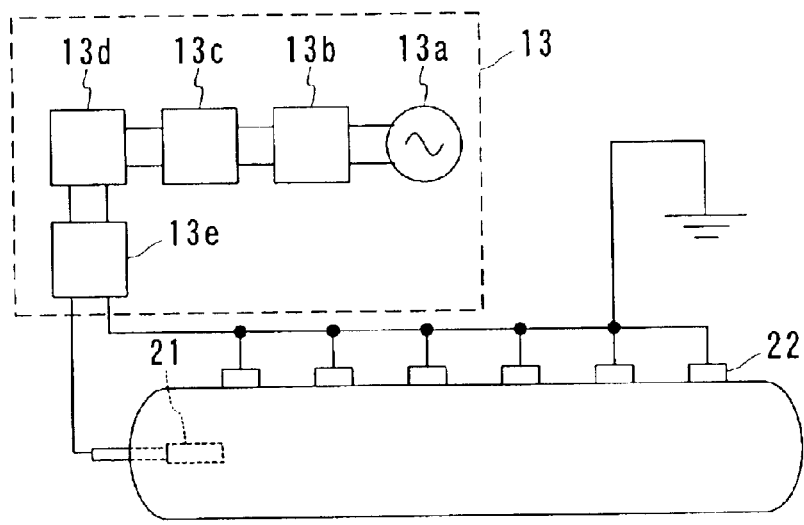
FIG. 4 is a view schematically illustrating an example of a driving circuit for actuating a light source device of the present invention.

FIG. 4 illustrates a configuration of an example of a driving circuit 13 for applying the voltage as shown in FIG. 3A. The driving circuit 13 is connected between the first and second electrodes 21 and 22. The second electrode 22 normally is grounded. The driving circuit 13 may include an AC power supply 13a, a rectifier circuit 13b, a smoothing circuit 13c, a boosting circuit 13d, and a switching circuit 13e. Generally-used circuits can be used as these circuits. An AC voltage generated by the AC power supply 13a is converted into a positive DC voltage by the rectifier circuit 13b. The rectified voltage is smoothed by the smoothing circuit 13c, and is boosted by the boosting circuit 13d. The boosted voltage is applied for a predetermined time T1 by the switching circuit 13e. Thus, a rectangular-waveform voltage is applied.

In the light source device 10, since the second electrode 22 is in contact with the discharge tube 20 discontinuously, it is possible to prevent discharge constriction toward the second electrode 22 side. Therefore, with the light source device 10, it is likely to obtain uniform discharge, even if the pressure of the sealed gas is increased, or even if the supplied power is increased. Consequently, in the light source device 10, it is possible to improve the discharge efficiency, and in some cases a luminescence thereof can be increased by 5 to 20% as compared with a conventional light source device to which an equal power is supplied. Furthermore, in the light source device 10, the second electrode 22 can be fixed easily so as to be in contact with the discharge tube 20. Therefore, the light source device 10 can be manufactured readily at a low cost.

Figure 5A:
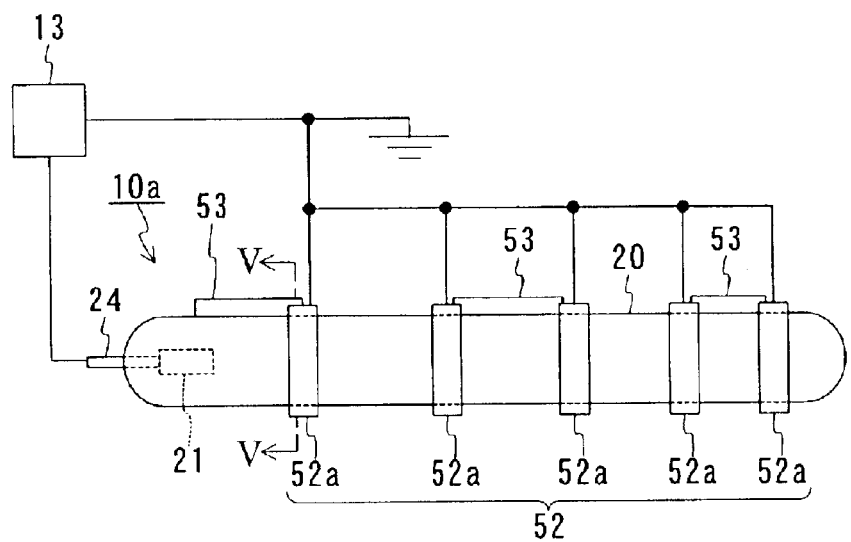
FIGS. 5A and 5B are a side view and a cross-sectional view, respectively, which schematically illustrate still another example of a light source device of the present invention.
Figure 5B:
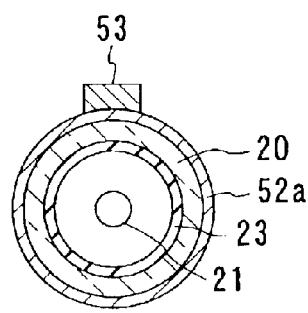

The light source device of the present invention further may include third electrodes, each in a linear form, provided in parallel with the central axis of the discharge tube 20 (this also applies to light source devices of Embodiments described later). An example of such a light source device is shown in FIG. 5A. FIG. 5B is a cross-sectional view of the light source device taken along a line V—V in FIG. 5A. A light source device 10a shown in FIG. 5A includes a discharge tube 20, a first electrode 21, a second electrode 52, and third electrodes 53. A driving circuit 13 is connected with the first electrode 21 and the second electrode 52.

The second electrode 52 of the light source device 10a includes a plurality of cylindrical electrodes 52a. Each of the electrodes 52a is arranged around the circumference of the discharge tube 20. The electrodes 52a can be made of, for example, a metal or a metal paste (for instance, silver paste).

The third electrodes 53 are formed in a linear shape, each on an outer surface of the discharge tube 20, so as to be in parallel with a central axis of the discharge tube 20. The third electrodes 53 are formed discontinuously. The third electrodes 53 can be made of, for instance, a metal or a metal paste. In the example shown in FIGS. 5A and 5B, each third electrode 53 connects two adjacent electrodes 52a. However, the second electrode 52 and the third electrodes 53 do not have to be connected with each other. The third electrodes 53 may have a potential equal to that of the second electrode 52 or in a range between a potential of the first electrode 21 and a potential of the second electrode 52. In other words, a potential E1 of the first electrode, a potential E2 of the second electrode, and a potential E3 of the third electrodes satisfy the relationships expressed as |E2|≦E3|<|E1| and 0≦E1·E3.

The third electrodes 53 preferably have as small a width as possible. By setting the width of the third electrodes 53 smaller than the thickness of the discharge tube 20, adverse influences thereof on the discharge can be suppressed. Thus, the third electrodes 53 facilitate the stabilization of the discharge. It should be noted that the third electrodes 53 may be formed on an inner surface of the discharge tube 20. In such a case, the phosphor layer 23 is formed so as to cover the third electrodes 53. In this case, the third electrodes 53 preferably are made of a transparent conductive material containing tin oxide as a principal component, or a transparent conductive material containing indium oxide as a principal component.

Embodiment 2

Figure 6:
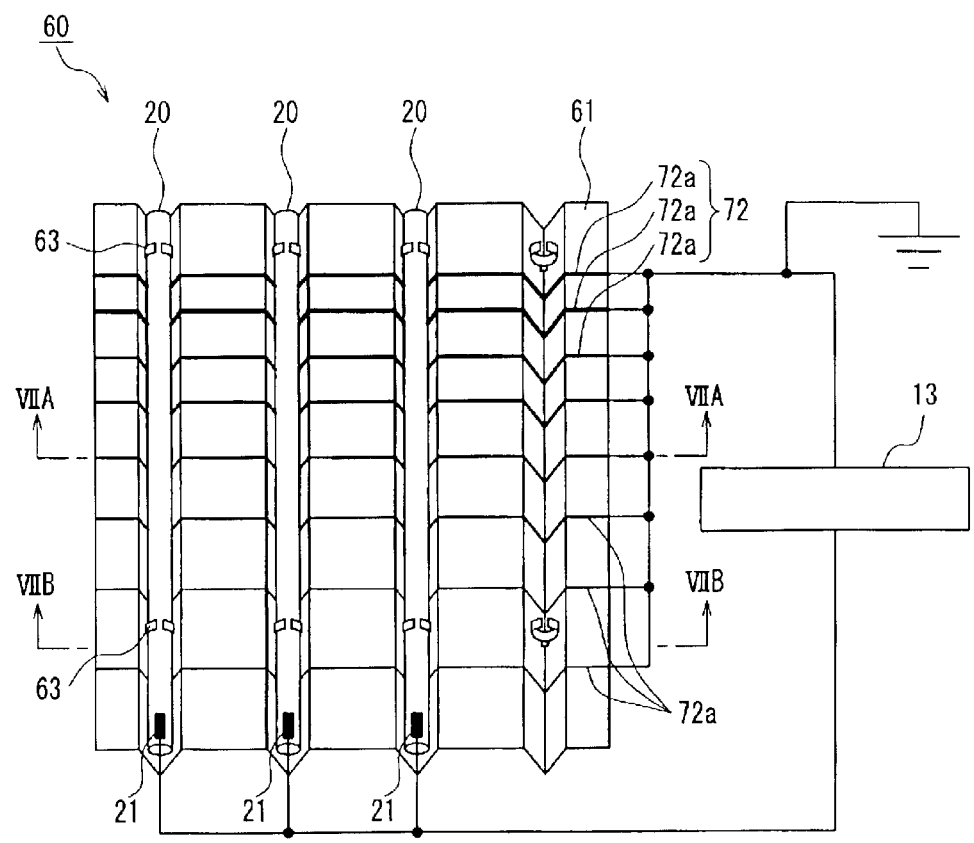
FIG. 6 is a view schematically illustrating still another example of a light source device of the present invention.
Figure 7A:
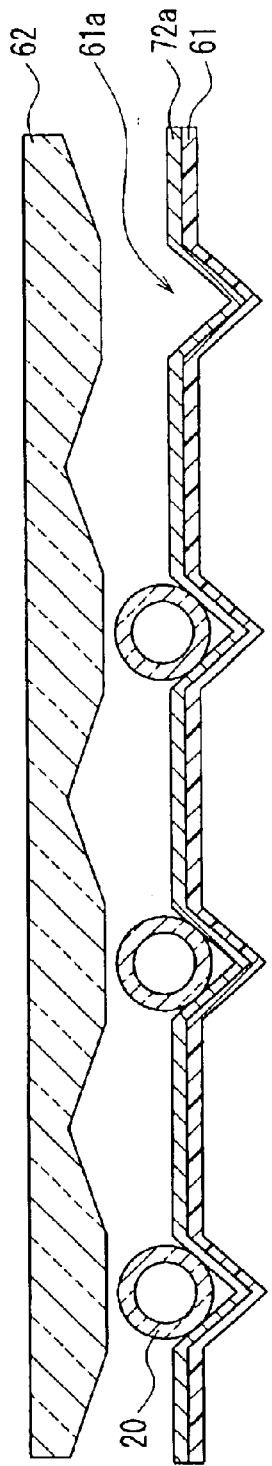
FIGS. 7A and 7B are cross-sectional views of the light source device shown in FIG. 6.
Figure 7B:
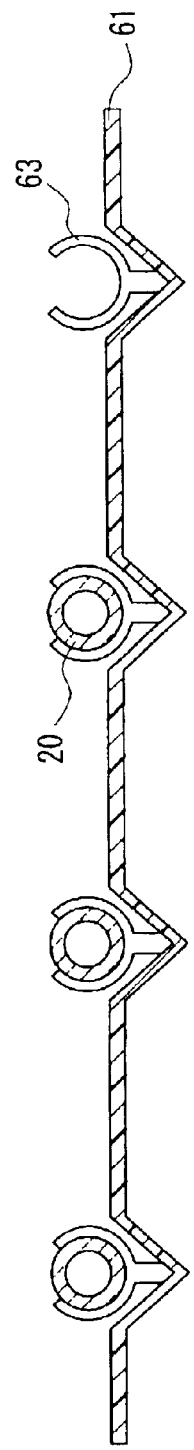

In Embodiment 2, another example of a light source device of the present invention is described. FIG. 6 schematically illustrates a configuration of a light source device 60 of Embodiment 2. FIG. 7A is a cross-sectional view of the light source device 60 taken along a line VIIA—VIIA in FIG. 6, and FIG. 7B is a cross-sectional view of the same taken along a line VIIB—VIIB in FIG. 6. It should be noted that the illustration of a diffusing plate is omitted in FIG. 6. In FIGS. 7A and 7B, the illustration of a phosphor layer is omitted. Further, in FIGS. 6, 7A, and 7B, the illustration of a rightmost discharge tube is omitted.

The light source device 60 includes a supporting plate 61, a diffusing plate 62, discharge tubes 20, first electrodes 21 provided inside the discharge tubes 20, and a second electrode 72 provided outside the discharge tubes 20. The second electrode 72 is connected with a ground potential. A voltage is applied across each first electrode 21 and the second electrode 72 by a driving circuit 13. As the driving circuit 13, any one of generally used circuits including an inverter circuit can be used.

Figure 8A:
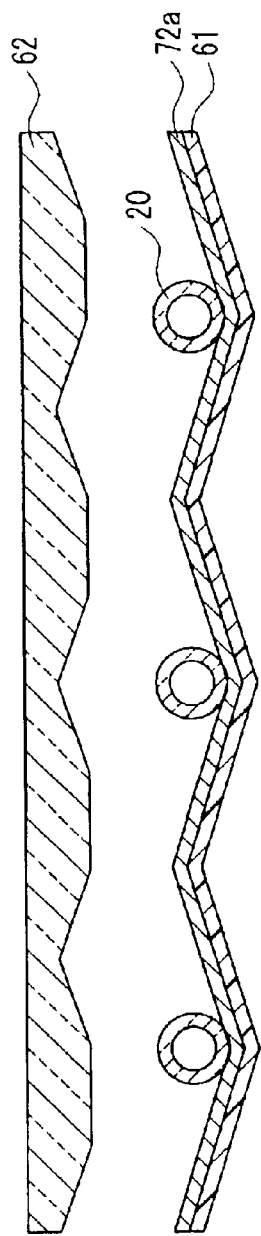
FIGS. 8A and 8B are cross-sectional views illustrating other examples of a diffusing plate for use in a light source device of the present invention.
Figure 8B:
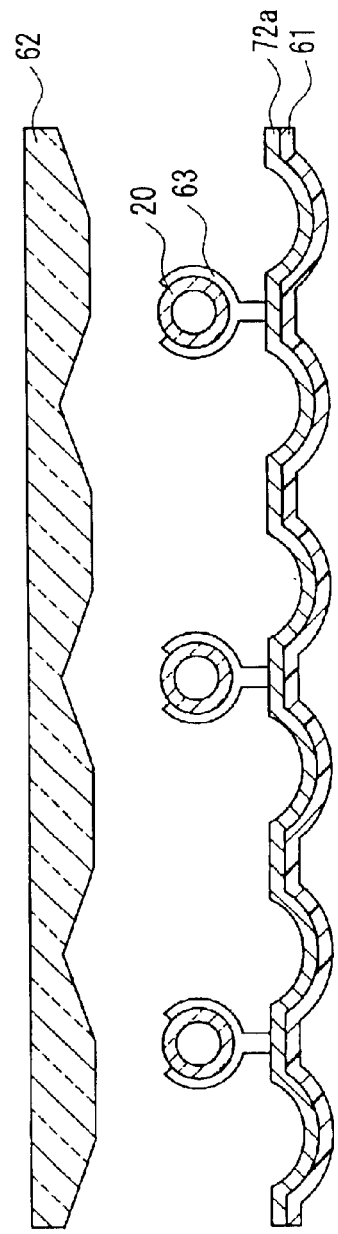

Grooves 61a having a V-shaped cross section each are formed in the supporting plate 61 so that the discharge tubes 20 are arranged in the grooves 61a. The discharge tubes 20 are fixed to the supporting plate 61 by supporting members 63. The supporting plate 61 can be made of a resin or a metal (for instance, aluminum). A surface of the supporting plate 61 preferably is treated so as to have an increased light reflection efficiency or an increased light diffusion efficiency. For instance, titanium oxide powder may be applied to or a reflection sheet may be laminated over the surface. Furthermore, a metal film may be formed on the surface of the supporting plate 61 as long as insulation from the second electrode 72 is ensured. Alternatively, the surface may be treated by sand blasting. It should be noted that in the case where light is allowed to leave from a reverse side of the supporting plate 61, the supporting plate 61 is made of a transparent resin or glass. The shape of the supporting plate 61 is not limited, and is determined according to the purpose of use. Other examples of the shape of the supporting plate 61 are shown in FIGS. 8A and 8B. In the case of the example shown in FIG. 8B, the supporting members 63 are made of a conductive material and function as a part of the second electrode.

The diffusing plate 62 is arranged so as to face the supporting plate 61 with the discharge tubes 20 interposed therebetween. The diffusing plate 62 is arranged so as to uniformly diffuse light emitted from the discharge tubes 20. The diffusing plate 62 is made of glass or a transparent resin.

A plurality of discharge tubes 20 are arranged in parallel with each other on the supporting plate 61. The number of the discharge tubes 20 is not limited, and one discharge tube 20 may be provided. The first electrode 21 is arranged inside an end of each discharge tube 20. The discharge tubes 20 can be detached easily from the supporting members 63.

The second electrode 72 includes a plurality of linear electrodes 72a, formed on the supporting plate 61. The plurality of linear electrodes 72a are connected with each other and are connected to a driving circuit 13. As shown in FIG. 6, the second electrode 72 preferably is grounded. The grounding of the second electrode 72 makes it possible to replace the discharge tubes 20 safely. The plurality of linear electrodes 72a may be arranged in stripes. The linear electrodes 72a may be formed so as to cross central axes of the discharge tubes 20 at right angles. The linear electrodes 72a may be formed using, for instance, a metal paste (for example, silver paste) or metal films. Alternatively, the linear electrodes 72a may be formed using a conductive resin. In this case, the supporting plate 61 made of a resin and the linear electrodes 72a made of a resin can be formed integrally.

With distances between adjacent ones of the linear electrodes 72a being set to be uniform, sometimes a luminance decreases with decreasing proximity to the first electrodes 21. Therefore, as shown in FIG. 6, the distance between adjacent linear electrodes 72a may be decreased with decreasing proximity to the first electrodes 21. In this case, the linear electrode 72a may have an increased thickness with decreasing proximity to the first electrodes 21. This configuration facilitates obtaining uniform light emission.

As shown in FIG. 7A, the linear electrodes 72a are in contact with the discharge tubes 20 at the grooves 61a. In other words, the second electrode 72 is brought into contact with an outer surface of each discharge tube 20 at a plurality of contact portions that are located at different distances from the first electrode 21. The contact portions form two groups arranged in parallel with the central axis of the discharge tube 20, as the contact portions 22P shown in FIG. 2B. These contact portions are separate from each other, and are provided discontinuously.

In the light source device 60, the application of a voltage across each first electrode 21 and the second electrode 72 causes discharge, thereby exciting the discharge medium. The discharge medium thus excited emits ultraviolet light when making a transition to a ground state. The ultraviolet light is converted into visible light by the phosphor layer 23, and the visible light is radiated from the discharge tubes 20. The visible light thus radiated is made more uniform by the diffusing plate 62. Thus, the light source device 60 functions as a planar light source.

Figure 9A:
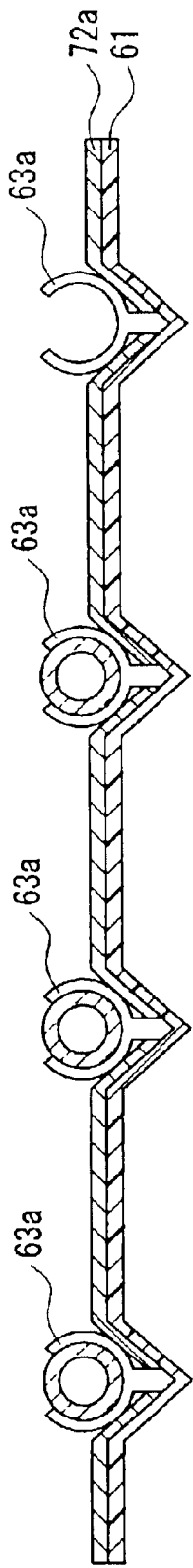
FIGS. 9A and 9B are cross-sectional views illustrating other examples of supporting members for use in a light source device of the present invention.
Figure 9B:
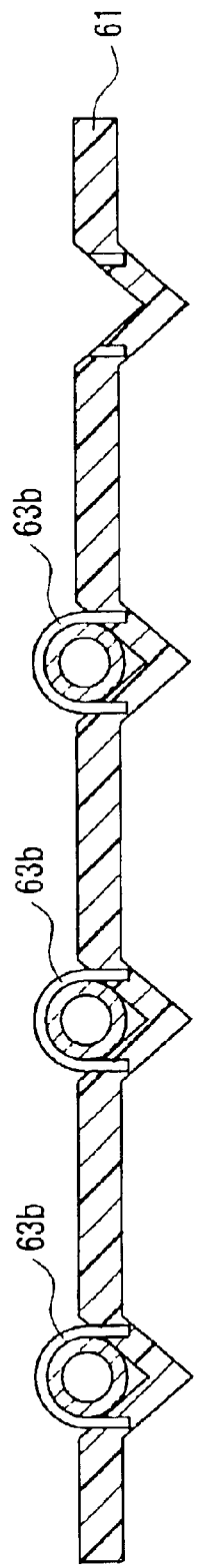

So far the light source device according to Embodiment 2 has been described, but the light source device of the present invention is not limited to the form shown in the drawings. Other forms of the supporting members 63 are shown in FIGS. 9A and 9B. In the example shown in FIG. 9A, supporting members 63a are made of a metal and are connected with the second electrode 72. Therefore, the supporting members 63a function as a part of the second electrode 72. The example shown in FIG. 9B employs supporting members 63b that are detachable with respect to the supporting plate 61. The supporting members 63 and 63b preferably are made of an insulating material such as a resin. It should be noted that the discharge tubes may be fixed using an adhesive or a sticky tape, instead of the supporting members 63.

Figure 10:
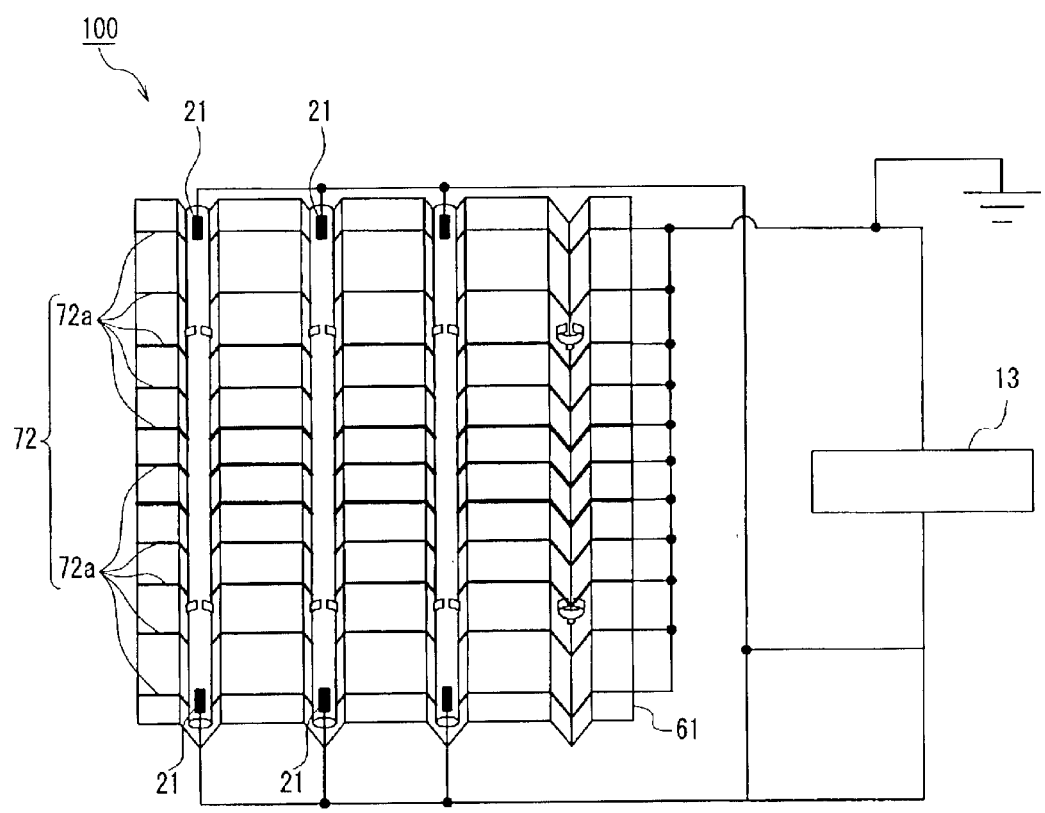
FIG. 10 is a view schematically illustrating still another example of a light source device of the present invention.

Further, the first electrodes 21 may be provided at both ends of each discharge tube 20. An example of such a light source device is shown in FIG. 10. A light source device 100 shown in FIG. 10 includes first electrodes 21 that are provided at both ends of each discharge tube 20. A distance between adjacent linear electrodes 72a is narrowed with decreasing proximity to the first electrodes 21. It should be noted that each discharge tube 20 may have a decreased inside diameter or may be closed at a midsection of the discharge tube 20.

Figure 11A:
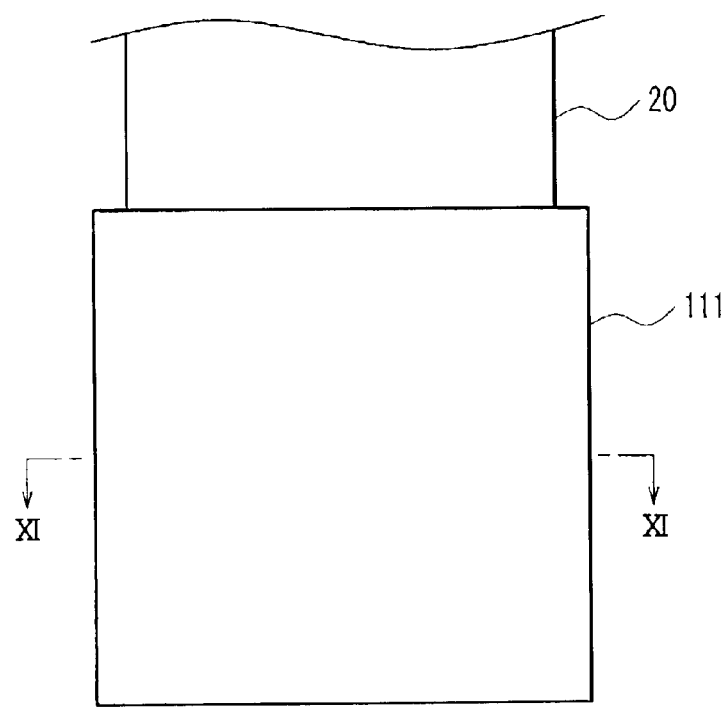
FIGS. 11A and 11B are a side view and a cross-sectional view, respectively, illustrating an example of a first electrode formed outside a discharge tube.
Figure 11B:
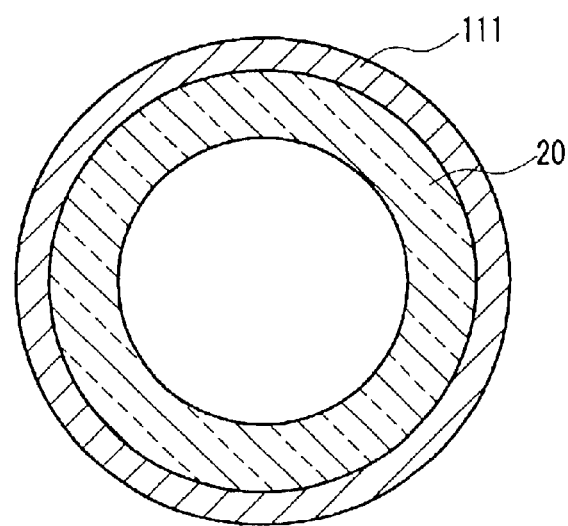

Furthermore, the first electrodes 21 may be formed outside the discharge tube 20. FIG. 11A illustrates a first electrode 111 obtained by modifying the first electrode 21. FIG. 11B is a cross-sectional view of the first electrode 111 taken along a line XI—XI in FIG. 11A. The first electrode 111 may be in a cylindrical form, and is provided around a circumferential surface of an end of the discharge tube 20.

The first electrode 111 and a wire can be connected with each other in various manners. FIGS. 12A to 12D illustrate four types of connections. In FIGS. 12A to 12D, the first electrode 111 and a lead wire 121 are connected with each other via an electrode terminal 122 (and a conductive member 123). An insulating layer 124 is formed around the electrode terminal 122. In the connection shown in FIG. 12D, the attachment/detachment of the discharge tube 20 is facilitated using a spring.

Figure 13:
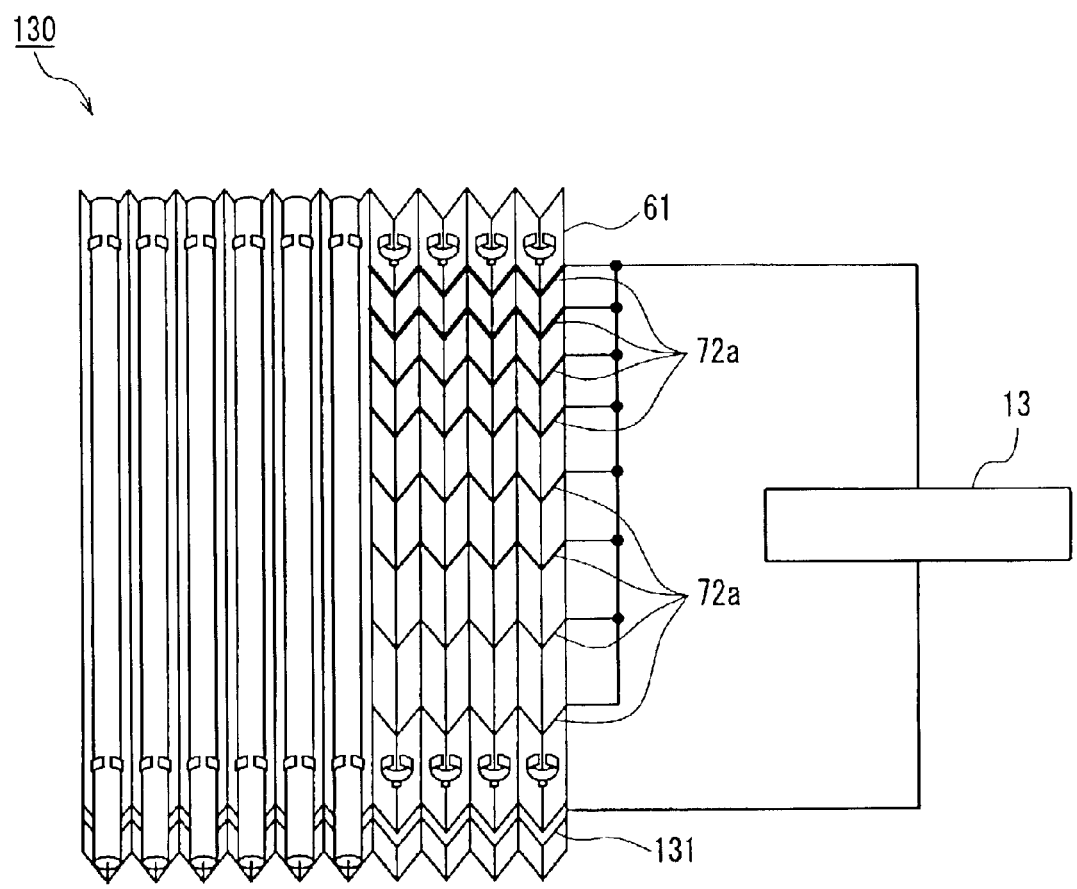
FIG. 13 is a view schematically illustrating still another example of a light source device of the present invention.

Furthermore, the first electrode 21 may be formed on a supporting plate, as the second electrode 72 is. An example of such a light source device is shown in FIG. 13. In the light source device 130 shown in FIG. 13, first electrodes 131, each in a linear form, are formed on a supporting plate 61 so as to be perpendicular to the discharge tubes 20. Such first electrodes 131 can be made of a conductive material such as a metal paste, like the second electrode 72.

Figure 14:
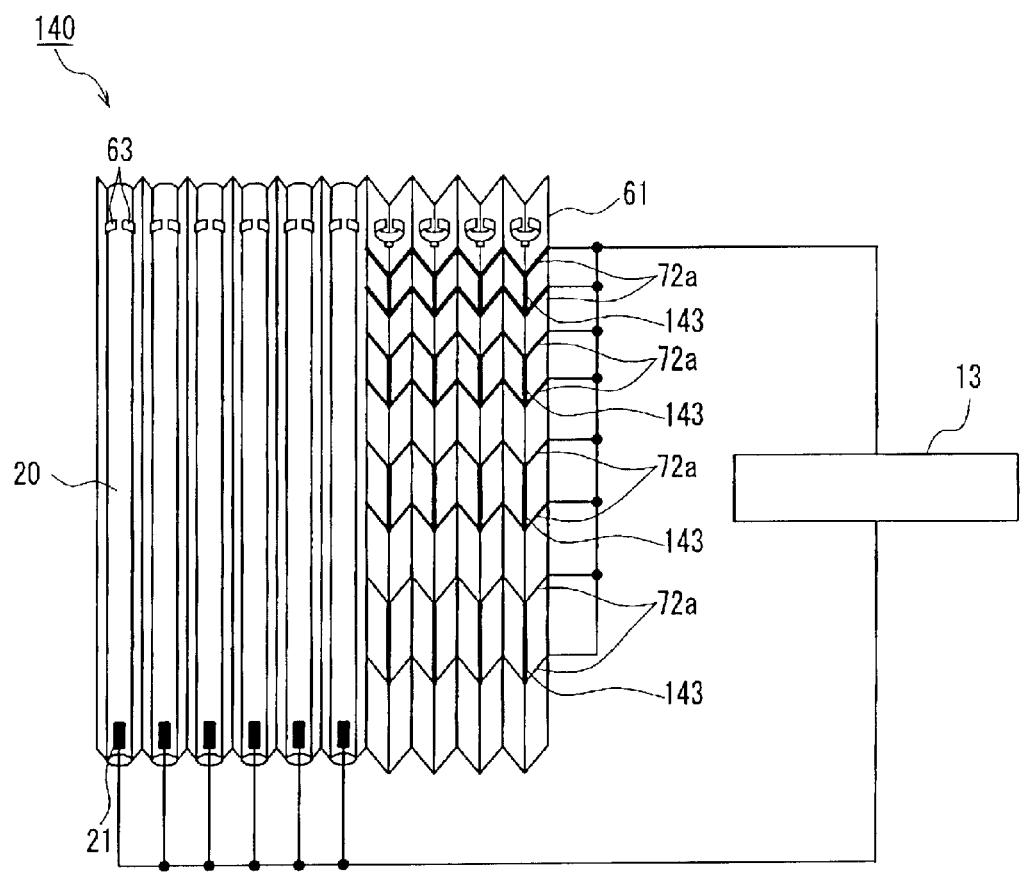
FIG. 14 is a view schematically illustrating still another example of a light source device of the present invention.

The light source device of Embodiment 2 further may include third electrodes arranged in parallel with central axes of the discharge tubes 20. An example of such a light source device is shown in FIG. 14. Since the only difference of a light source device 140 shown in FIG. 14 from the light source device 60 is that the light source device 140 includes a plurality of the third electrodes 143, duplicate descriptions will be omitted.

The third electrodes 143 are formed so as to connect adjacent linear electrodes 72a. The plurality of third electrodes 143 are provided discontinuously, that is, dispersedly. The third electrodes 143 can be made of the same material as that for the linear electrodes 72a.

With the light source device of Embodiment 2, it is possible to achieve the same effects as those achieved by the light source device of Embodiment 1. The light source device of Embodiment 2 is applicable as a planar light source, for instance, a backlight for a liquid crystal display. In this case, a liquid crystal panel is arranged above the diffusing plate 62.

Embodiment 3

Figure 15:
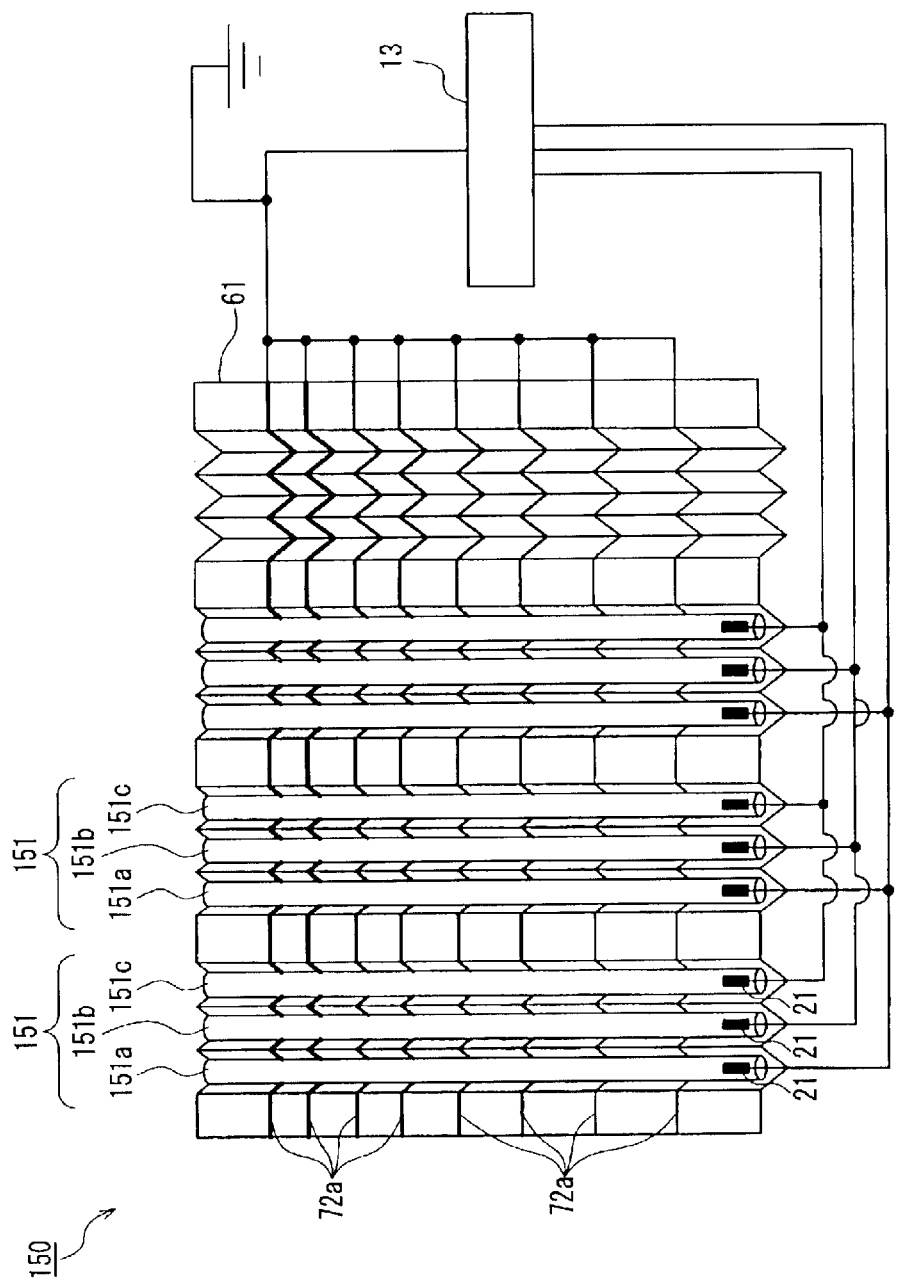
FIG. 15 is a view schematically illustrating still another example of a light source device of the present invention.

In Embodiment 3, another light source of the present invention is described. The light source device of Embodiment 3 is applicable in a field-sequential display device. FIG. 15 schematically illustrates a configuration of a light source device 150 of Embodiment 3.

In the light source device 150, a plurality of discharge tube groups 151 are provided, each discharge tube group 151 being composed of three types of discharge tubes, which are discharge tubes 151a, 151b, and 151c. The discharge tubes 151a, 151b, and 151c are arranged in the stated order repetitively. The discharge tubes 151a, 151b, and 151c emit lights with wavelengths different from one another. In other words, the discharge tubes have layers of phosphors corresponding to the lights to be emitted. The phosphor layers are made of known phosphors. More specifically, the discharge tubes 151a, 151b, and 151c may be those which emit red, green, and blue lights, respectively. Alternatively, the discharge tubes 151a, 151b, and 151c may be those which emit cyan, magenta, and yellow lights, respectively. By turning on these discharge tubes 151a, 151b, and 151c at the same time, white light is obtained.

In a field-sequential display device, a liquid crystal panel is arranged above the light source device 150. The liquid crystal panel is arranged in the same manner as that in the case of a device shown in FIG. 17. A liquid crystal panel identical to that for use in a monochromatic liquid crystal display device is applicable as the foregoing liquid crystal panel. For displaying an image, the discharge tubes 151a, 151b, and 151c are turned on/off sequentially at a high speed. Consequently, lights of, for instance, red, green, and blue colors are emitted sequentially. At each pixel in the liquid crystal panel, liquid crystal is actuated so as to control an open time (time during which light is transmitted). For instance, at a pixel to display yellow color, an open time for emitting red light and an open time for emitting green light may be set equal, with an open time for emitting blue light being set null. In such a case, the red light and the green light thus emitted are synthesized by persistence of vision, and are perceived as yellow by a human. In such a field-sequential display device, color filters for a liquid crystal panel are unnecessary. Therefore, it is possible to reduce each pixel in size, thereby making it possible to achieve the high-definition image display. Furthermore, in the case where the pixel size is unchanged, loss of light due to the color filters is eliminated, thereby achieving an increase in the light utilization efficiency.

It should be noted that the light source device of the present invention further may include a diffusing plate that is arranged between the liquid crystal panel and the discharge tubes (this also applies to Embodiment described later). Furthermore, it further may include third electrodes, as the light source device 140 does. The discharge tube groups 151 may be arranged on a side of a light-guiding plate.

Embodiment 4

Figure 16:
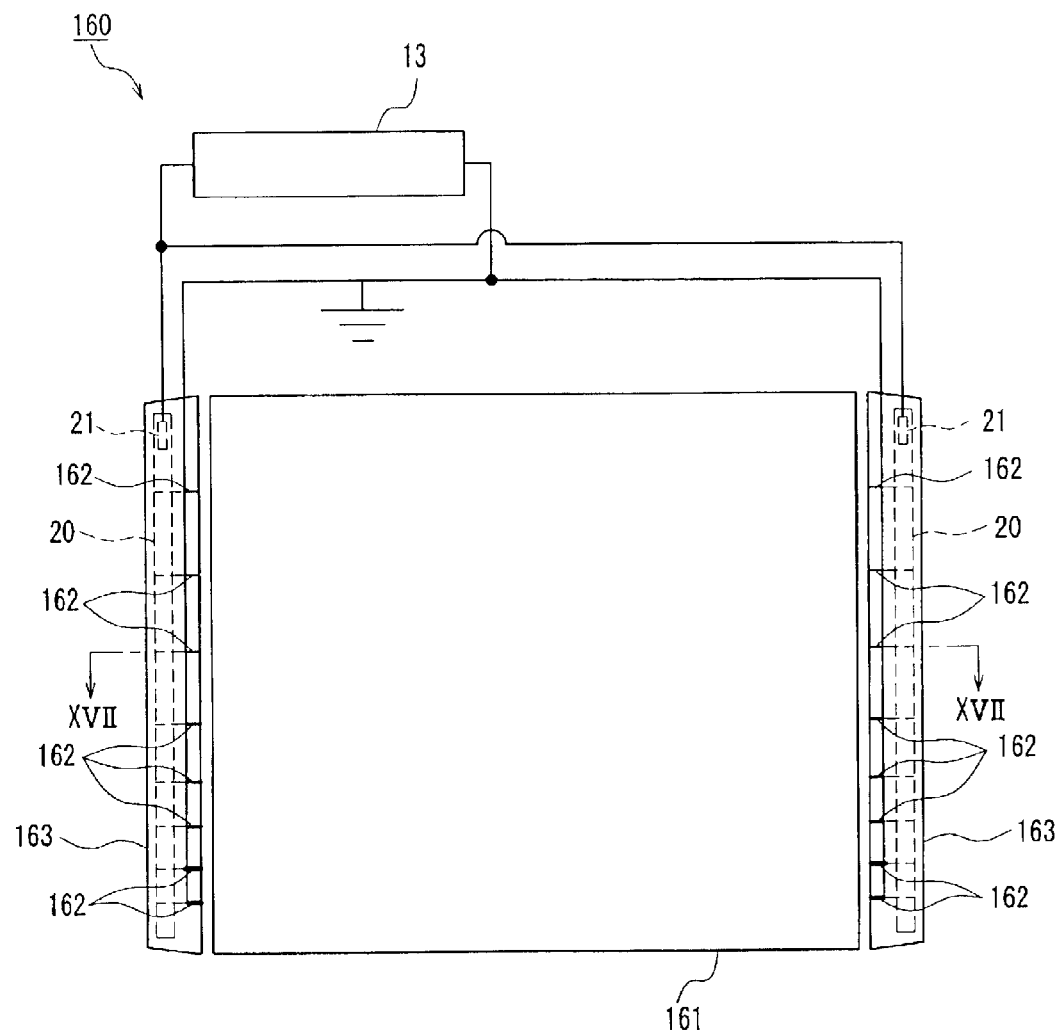
FIG. 16 is a view schematically illustrating still another example of a light source device of the present invention.
Figure 17:
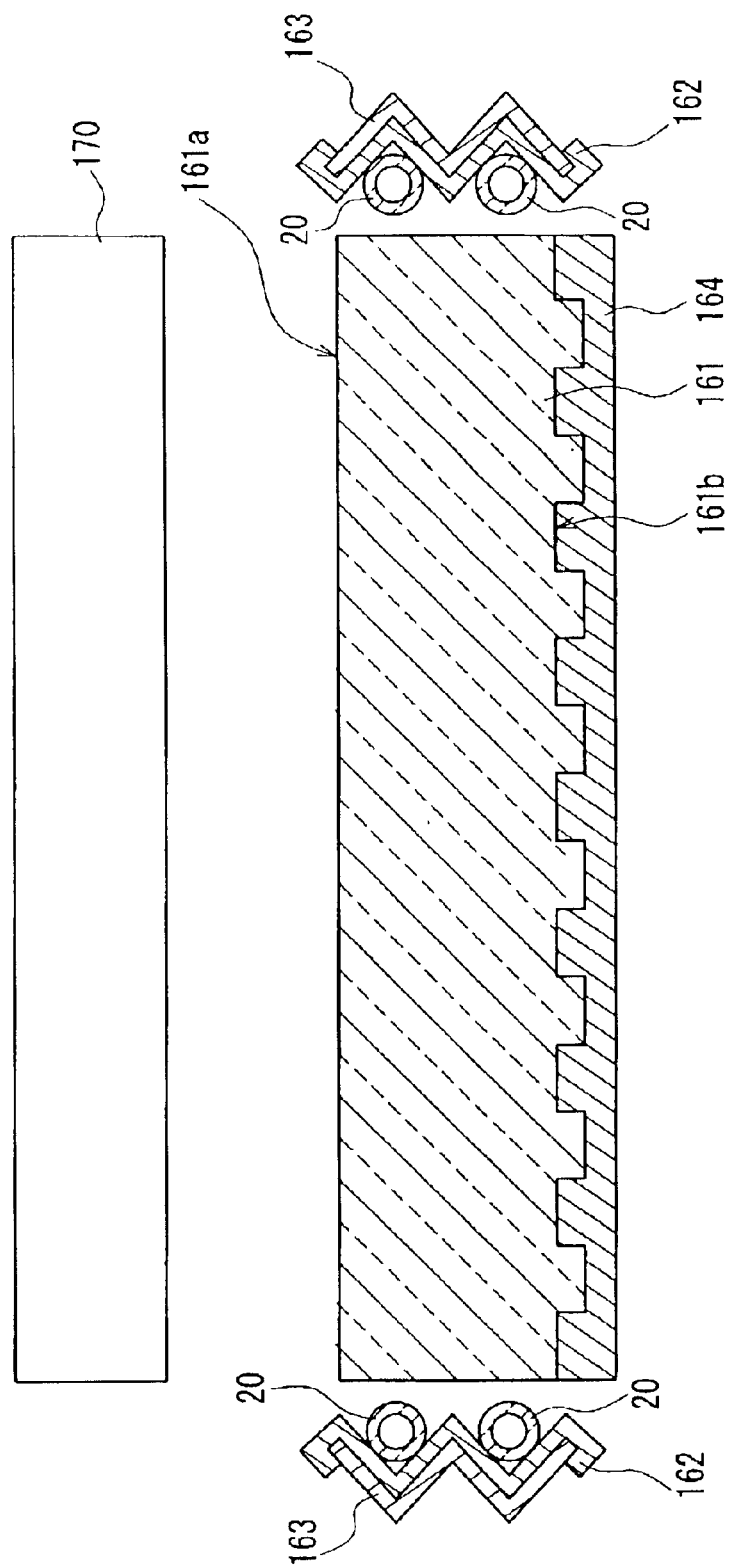
FIG. 17 is a cross-sectional view of an example of a liquid crystal display device in which a light source device shown in FIG. 16 is employed.

In Embodiment 4, still another example of a light source device of the present invention is described. A light source device of Embodiment 4 is shown in FIG. 16. FIG. 17 is a cross-sectional view of the light source device taken along a line XVII—XVII in FIG. 16. It should be noted that a liquid crystal panel 170 also is illustrated in FIG. 17.

A light source device 160 shown in FIG. 16 includes a light-guiding plate 161, discharge tubes 20, a first electrode 21, and a second electrode 162.

The second electrode 162 is formed on a supporting plate 163. The supporting plate 163 fixes the discharge tubes 20, as well as functions as a reflecting plate.

The discharge tubes 20 are arranged on a side of a light-guiding plate 161. The light-guiding plate 161 causes light emitted from the discharge tubes 20 to leave a front face 161a of the light-guiding plate 161 substantially uniformly. The light-guiding plate 161 can be made of, for instance, a transparent resin. A rear face 161b of the light-guiding plate 161 is corrugated so as to make the light leaving therefrom uniform. Additionally, a reflecting layer 164 is formed on the rear face 161b. The reflecting layer 164 can be made of, for instance, titanium oxide or a metal. Furthermore, a diffusing sheet or a lens sheet may be arranged on the front face 161a of the light-guiding plate 161 as required according to a condition of use. In the light source device 160 as well, the second electrode 162 is in contact with each discharge tube 20 at a plurality of portions that are located at different distances from the first electrode 21 and that are provided discontinuously.

In the case where the light source device 160 is used in a liquid crystal display device, a liquid crystal panel 170 is arranged on the light-guiding plate 161 as shown in FIG. 17 (this also applies to light source devices described later).

Figure 18:
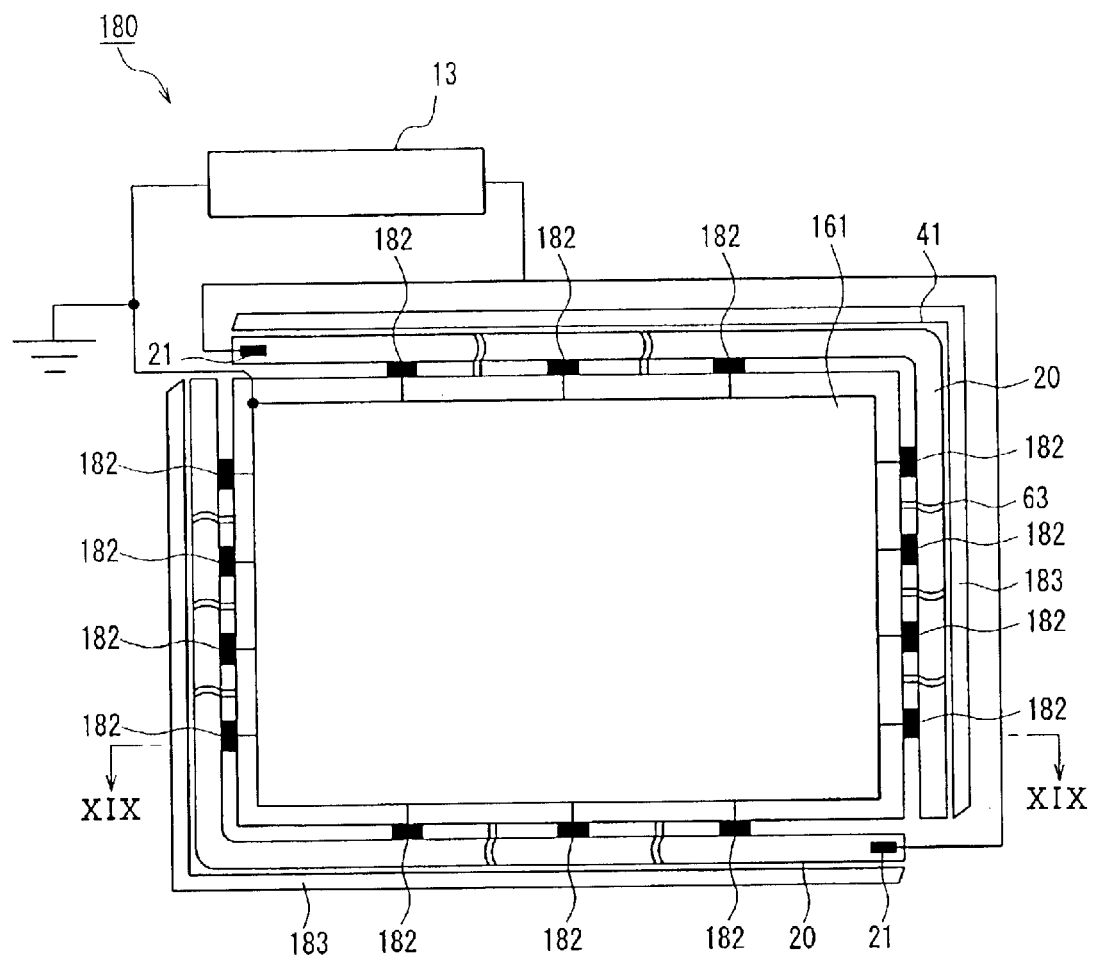
FIG. 18 is a view schematically illustrating still another example of a light source device of the present invention.
Figure 19:
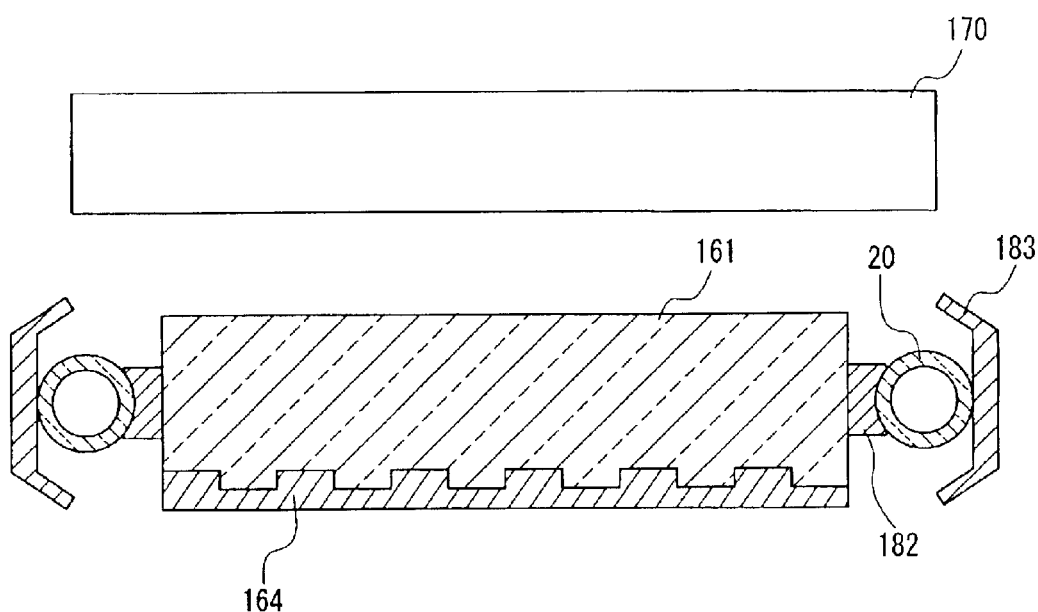
FIG. 19 is a cross-sectional view of an example of a liquid crystal display device in which a light source device shown in FIG. 18 is employed.

It should be noted that the second electrode may be formed between the light-guiding plate and the discharge tubes. FIG. 18 schematically illustrates a configuration of such a light source device 180. FIG. 19 is a cross-sectional view of the light source device taken along a line XIX—XIX. It should be noted that the liquid crystal panel 170 also is illustrated in FIG. 19.

In the light source device 180, a second electrode 182 is arranged between a light-guiding plate 161 and discharge tubes 20. A second electrode 182 can be made of a metal paste, a conductive resin, or the like. The discharge tubes 20, each in a shape of the letter L, are supported by supporting members 63. A third electrode preferably is formed at a bend of the L-shaped discharge tube 20. Reflecting plates 183 are provided outside the discharge tubes 20, for reflecting light emitted from the discharge tubes 20 toward the light-guiding plate 161 side. In the case where the light source device 180 is used as a backlight of the liquid crystal display device, a liquid crystal panel 170 is provided on the light-guiding plate 161 as shown in FIG. 19.

The following describes an example of the light source device 180. The light-guiding plate may be made of an acrylic resin, and a size thereof may be set to be 160 mm×93 mm. A length, an outside diameter, and an inside diameter of the L-shaped discharge tube may be set to be 252 mm, 2.6 mm, and 2.0 mm, respectively. A mixture gas of xenon gas and argon gas (pressure: approximately 21 kPa) may be used as a discharge medium. A length in the tube axial direction of each contact portion of the discharge tube in contact with the second electrode may be set to be 3 mm. Furthermore, a distance between adjacent contact portions may be set to be 1 mm.

Figure 20:
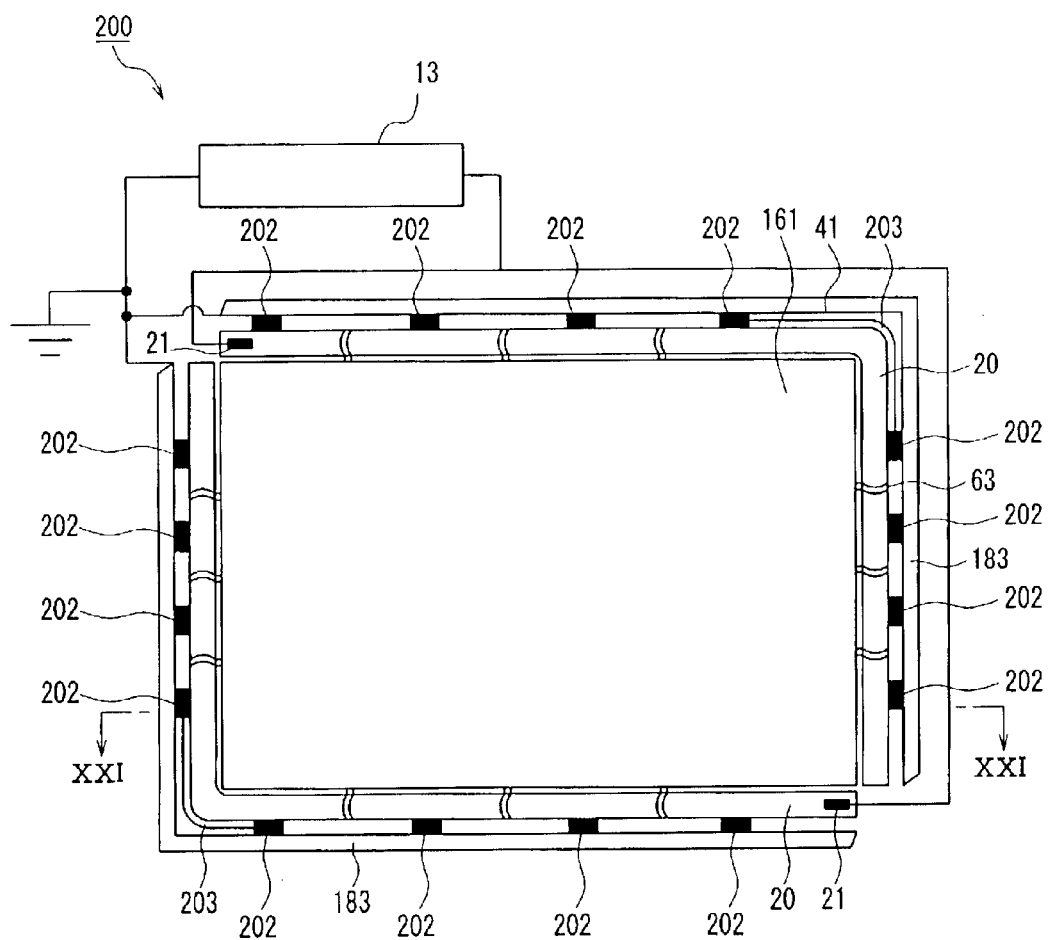
FIG. 20 is a view schematically illustrating still another example of a light source device of the present invention.
Figure 21:
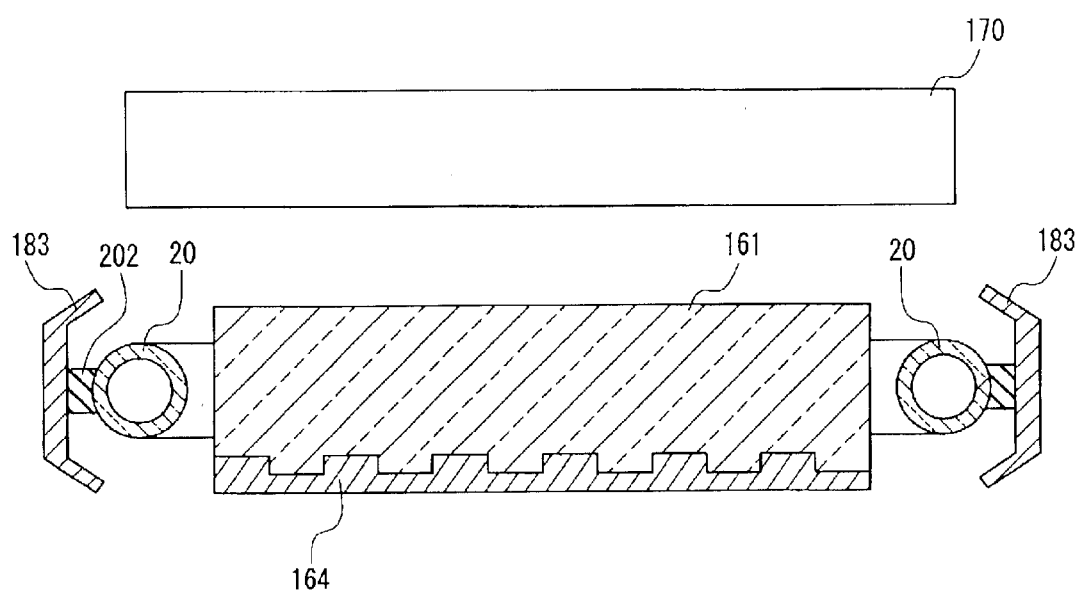
FIG. 21 is a cross-sectional view of an example of a liquid crystal display device in which a light source device shown in FIG. 20 is employed.

The second electrode may be arranged between the discharge tubes and the reflecting plates. A configuration of such a light source device 200 is illustrated schematically in FIG. 20. FIG. 21 is a cross-sectional view of the light source device 200 taken along a line XXI—XXI. It should be noted that a liquid crystal display panel 170 also is illustrated in FIG. 21.

In the light source device 200, a second electrode 202 is arranged between discharge tubes 20 and reflecting plates 183. The second electrode 202 can be formed using a metal paste, a conductive resin, or the like. The L-shaped discharge tube 20 may be supported by supporting members 63. A third electrode 203 may be formed at a bend of the L-shaped discharge tube 20. The reflecting plates 183 arranged outside the discharge tubes 20 reflect light emitted from the discharge tubes 20 toward the light-guiding plate 161 side. In the case where the light source device 200 is used as a backlight of a liquid crystal display device, a liquid crystal panel 170 is provided on the light-guiding plate 161 as shown in FIG. 21.

As described above, in a light source device of the present invention, a second electrode and discharge tubes are in contact with each other at a plurality of portions that are located at different distances from the first electrodes. This light source device can prevent the discharge from being concentrated in the vicinity of the second electrode. Further, the light source device of the present invention does not require the use of a shrinkable tube or the like for fixing the second electrode to the discharge tubes. Therefore, it is manufactured readily, and allows the discharge tubes to be formed in freely determined shapes. The light source device of the present invention is applicable as a light source in various apparatuses, for instance, as a backlight in a liquid crystal display device.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light source device comprising:
   at least one discharge tube;
   a discharge medium sealed inside the discharge tube; and
   first and second electrodes for exciting the discharge medium,
   wherein
   the first electrode is arranged inside or outside the discharge tube, and
   the second electrode is in contact with an outer surface of the discharge tube at a plurality of contact portions, the contact portions being located at different distances from the first electrode and being provided discontinuously,
   wherein the plurality of the contact portions are arranged in a tube axial direction of the discharge tube,
   the first electrode is formed at an end of the discharge tube, and
   a distance between adjacent ones of the contact portions in the tube axial direction of the discharge tube is narrow with decreasing proximity to the first electrode.

2. The light source device according to claim 1, wherein a surface of the first electrode is covered with a dielectric.

3. The light source device according to claim 1, further comprising a phosphor layer formed on an inner surface of the discharge tube.

4. The light source device according to claim 1, wherein the discharge tube includes a glass tube, and a dielectric layer formed on an outer surface of the glass tube.

5. The light source device according to claim 1, wherein the second electrode is in contact with the discharge tube via a dielectric.

6. The light source device according to claim 1, wherein the discharge medium contains xenon gas.

7. The light source device according to claim 6, wherein the discharge medium further contains mercury.

8. The light source device according to claim 1, wherein the discharge medium does not contain mercury.

9. The light source device according to claim 1, further comprising a supporting plate, wherein the discharge tube is arranged on a side of the supporting plate.

10. The light source device according to claim 9, wherein the supporting plate receives light emitted from the discharge tube, and radiates the same from one principal surface of the supporting plate.

11. The light source device according to claim 1, further comprising a supporting plate,
    wherein
    a plurality of the discharge tubes are held on the supporting plate,
    the second electrode includes a plurality of linear electrodes arranged in parallel, and
    the discharge tubes are arranged so as to be perpendicular to the linear electrodes.

12. The light source device according to claim 1, wherein
    the discharge tubes comprise a plurality of first discharge tubes, a plurality of second discharge tubes, and a plurality of third discharge tubes,
    the first, second, and third discharge tubes are arranged in the stated order repetitively, and
    the first, second, and third discharge tubes emit lights with wavelengths different from one another, respectively.

13. The light source device according to claim 1, further comprising a third electrode arranged on an inner surface of or around the discharge tube,
    wherein
    the third electrode is formed in a linear form so as to be arranged in parallel with a tube axis of the discharge tube, and
    a potential E1 of the first electrode, a potential E2 of the second electrode, and a potential E3 of the third electrode satisfy relationships expressed as $|E2|\leq|E3|<|E1|$ and $0\leq E1\cdot E3$.

14. The light source device according to claim 13, wherein both ends of the third electrode are connected with the second electrode at two contact portions selected from the plurality of the contact portions.

15. A liquid crystal display comprising a light source device, and a liquid crystal panel that transmits light emitted from the light source device,
    wherein the light source device includes at least one discharge tube, a discharge medium sealed inside the discharge tube, and first and second electrodes for exciting the discharge medium,
    wherein
    the first electrode is arranged inside or outside the discharge tube, and
    the second electrode is in contact with an outer surface of the discharge tube at a plurality of contact portions, the contact portions being located at different distances from the first electrode and being provided discontinuously,
    wherein the plurality of the contact portions are arranged in a tube axial direction of the discharge tube,
    the first electrode is formed at an end of the discharge tube, and
    a distance between adjacent ones of the contact portions in the tube axial direction of the discharge tube is narrower with decreasing proximity to the first electrode.

16. The liquid crystal display according to claim 15, wherein
    the light source device further includes a light-guiding plate that receives light emitted from the discharge tube and allows the light to leave a principal surface thereof, and
    the liquid crystal panel is arranged so as to face the light-guiding plate.

17. The liquid crystal display according to claim 15, wherein the light source device further includes a supporting plate,
  wherein
  a plurality of the discharge tubes are held on the supporting plate, the second electrode includes a plurality of linear electrodes arranged in parallel, and the discharge tubes are arranged so as to be perpendicular to the linear electrodes.

* * * * *